United States Patent [19]
Glaeser et al.

[11] Patent Number: 5,481,676
[45] Date of Patent: Jan. 2, 1996

[54] ARRANGEMENT FOR THE DECENTRALIZED CONTROL OF ACCESS TO A BUS BY UNITS CONNECTED TO THE BUS

[75] Inventors: Winfried Glaeser, Markt Schwaben; Rudolf Holzner, Altdorf; Guenter Watzlawik, Taufkirchen, all of Germany

[73] Assignee: Siemens Aktiengesellschaft, Munich, Germany

[21] Appl. No.: 271,715

[22] Filed: Jul. 7, 1994

[30] Foreign Application Priority Data

Jul. 9, 1993 [DE] Germany .......................... 43 23 019.9

[51] Int. Cl.$^6$ ...................................................... G06F 13/36
[52] U.S. Cl. ..................... 395/287; 370/85.5; 370/85.15; 340/825.05; 364/242.92; 364/240; 364/240.1; 364/240.2; 364/DIG. 1
[58] Field of Search .................... 395/325, 275, 395/200, 287, 293, 275, 200; 271/11.2; 370/85.4, 85.5, 85.15; 340/825.05

[56] References Cited

U.S. PATENT DOCUMENTS

| | | | |
|---|---|---|---|
| 4,482,980 | 11/1984 | Korowitz et al. | 395/200 |
| 4,881,074 | 11/1989 | Reichbauer et al. | 340/825.05 |
| 4,914,652 | 4/1990 | Nguyen | 70/85.5 |
| 5,041,963 | 8/1991 | Ebersole et al. | 395/200 |
| 5,053,946 | 10/1991 | Jain | 395/275 |
| 5,155,725 | 10/1992 | Khalil | 370/85.5 |
| 5,165,019 | 11/1992 | Sweazey | 395/200 |
| 5,383,191 | 1/1995 | Hobgood et al. | 371/11.2 |
| 5,388,223 | 2/1995 | Guthrie et al. | 395/325 |

FOREIGN PATENT DOCUMENTS 0530847  3/1993  European Pat. Off. ........ G06F 13/37

*Primary Examiner*—Gopal C. Ray
*Attorney, Agent, or Firm*—Hill, Steadman & Simpson

[57] ABSTRACT

A control system for controlling access to a bus (BU) by a unit (P) connected to the bus (BU), including a ring circuit in which a monoflop function element and one or more coupling elements are connected in-line, each coupling element associated with a respective unit. For controlling access, a logic signal of a first type is supplied into the ring by the monoflop function element, the logic signal being successively conducted via the coupling elements to the units seeking access to the bus. Access to the bus is only allowed when the coupling element senses a transition from a logic state of the first type to a logic state of a second type at its ring circuit input.

12 Claims, 3 Drawing Sheets

ARRANGEMENT FOR THE DECENTRALIZED CONTROL OF ACCESS TO A BUS BY UNITS CONNECTED TO THE BUS

BACKGROUND OF THE INVENTION

The present invention generally relates to methods and systems for controlling access to a bus in a network. More specifically, the invention relates to decentralized bus access control systems.

When a plurality of units, for example, processors, are coupled to a bus which, for example, can be comprised of address, data and control lines, care should be exercised to ensure that only one unit utilizes the bus at any given time. Otherwise, a conflict can arise and the bus can become tied up.

The control of access of units to the bus is referred to as arbitration. Two control protocols are currently known for this purpose. In that regard, the arbitration can be centrally controlled by an arbiter or the arbitration can be decentrally controlled by and between the processors or units.

In decentralized arbitration, there are two standard methods employed. One method is referred to as CSMA-CD (carrier sense multiple access with collision detection) wherein a processor or unit is permitted to write onto the bus whenever the bus is available. However, if another processor uses the bus at the same time, a collision occurs and then the write event for a given unit or processor must be repeated. This method is explained under the heading "CSMA/CD-Verfahren" at page 147 in Müller, Löbel, Schmidt Lexikon der Datenverarbeitung, 1992, a copy of which accompanies this application, and the teachings of which are incorporated herein by reference.

The other standard method of decentralized arbitration or access control employs a token passing scheme in which a token is passed among the processes or units connected to the bus. In such method, the only processor or unit allowed to transmit on the bus is that unit with the token. The token can be made up of a processor address and control information. This method also is explained in the same reference under the heading "Token-Verfahren" at page 667.

SUMMARY OF THE INVENTION

The present invention provides another method for decentralized arbitration of access of units to a network bus.

To that end, in an embodiment, the invention provides an arrangement for the decentralized control of the access of units connected to a bus wherein a change in logic state awards access to the bus to a given unit receiving such change in logic state. In essence, this is a "token" passing system wherein the "token" passed is a specific change in logic state.

In that regard, in an embodiment, the invention provides a ring circuit associated with a bus, the ring circuit including a monoflop function unit connected in-line therein and at least one coupling element connected in-line in the ring circuit, the coupling element having two-way communication with a designated unit seeking access to the bus. The coupling unit is constructed to effect a logical OR operation on a logic signal from the monoflop function element and a logic signal from the unit seeking access to the bus. The output of the logical OR operation is fed back into the ring circuit. The monoflop element is configured to generate a logic signal of a first type only when it receives immediately upstream of it a transition from a logic state of the first type to a logic state of a second type. Similarly, the coupling element is configured to award access only when it receives immediately upstream of it the transition from a logic state of a first type to a logic state of the second type.

In an embodiment of the invention, a plurality of such coupling elements are provided in series within the ring circuit.

In an embodiment of the invention, a second ring circuit is coupled to one of the coupling elements in place of a unit seeking access to the bus, the second ring circuit including at least one further coupling element therein.

In an embodiment of the invention, the ring circuit comprises an optical circuit.

In an embodiment of the invention, the ring circuit comprises an electrical circuit.

These and other features and aspects of the invention will become clearer below with reference to the following detailed description of the presently preferred embodiments with reference to the accompanying drawings.

DETAILED DESCRIPTION OF THE PRESENTLY PREFERRED EMBODIMENTS

As described above, in essence the present invention provides a special type of "token" passing control system for controlling access to a bus, wherein the "token" in essence is the appearance of a transition from one logical state to another. In the presently preferred embodiment, this transition is the trailing edge of a pulse signal. It can be appreciated, however, that other transitions can be employed given properly configured circuits.

In that regard, as used herein a logic state can be represented by a variety of different signals, for example, a high or low voltage level, the symbol "1" or "0", a flag, presence or absence of light, etc. In the presently described embodiments, the symbols of "1" and "0" are used to denote the presence or absence of a voltage pulse. The symbol "1" thus represents a logic state of a first type while the symbol "0" represents the logic state of a second type. Similarly, a voltage pulse represents the logic signal of the first type while the absence of the voltage pulse, i.e., at least a sufficiently lower voltage level, represents the logic signal of the second type. Of course, as just described, different correspondences can be employed depending on the nature of the circuit used. No limitation is intended by the description of the invention in connection with the presently preferred embodiments.

Figure 1:
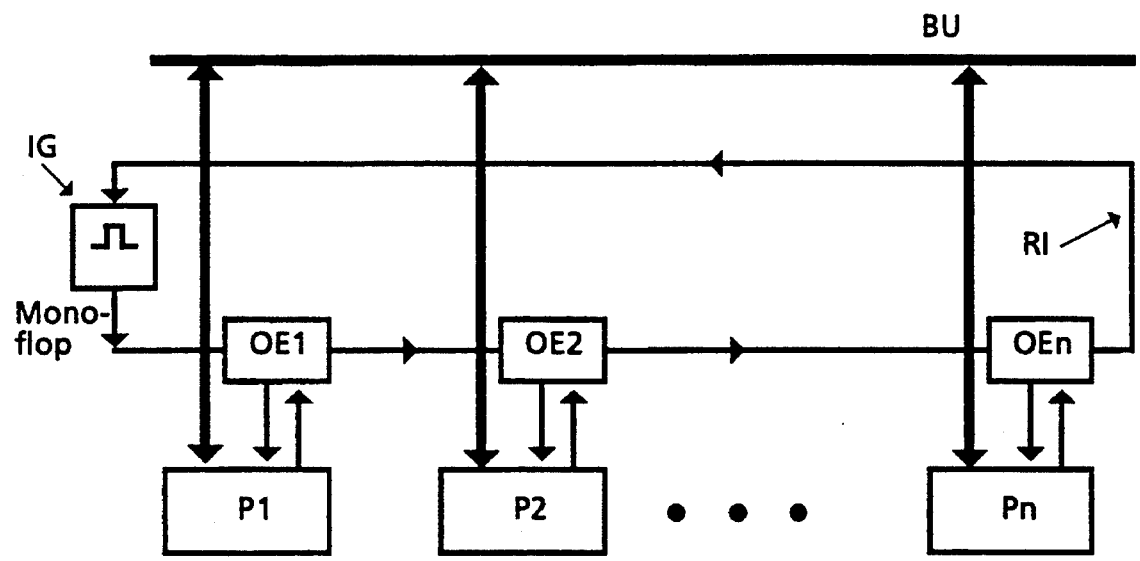
FIG. 1 is a schematic illustration of an arrangement for controlling access to a bus.

In FIG. 1 there is illustrated a block circuit diagram of an embodiment of the invention. In the illustrated embodiment, a plurality of units P1 through Pn, are coupled to a bus BU. It is the access of each of these units P1 to Pn to the bus BU that is to be controlled. While the units can be of any type, in the presently preferred embodiment, the units can comprise processors. The bus BU, therefore, can, for example, be an address and a databus.

As also illustrated in FIG. 1, there is included an arbitration ring RI that is comprised of unidirectional lines. It is through this arbitration ring RI that the "token" is passed. It can be appreciated that the ring RI is arranged in accordance with the bus BU. Further, the designation of the arbitration ring RI as a ring is only intended to express that the lines thereof form a closed loop in and of themselves in which signals essentially flow in a stream in one direction, without, however, attempting to define the geometry of the loop.

As also illustrated, a pulse generator IG, for example, a monoflop function unit, is arranged in-line in the ring RI. As will be appreciated, the pulse generator IG effects a monoflop operation by generating a logic state of a first type at its output whenever it receives a transition from a logic state of the first type to a logic state of the second type at its input. For example, when a monoflop sees a transition from a 1 to a 0, i.e., the trailing edge of a pulse signal, then the monoflop effects an operation to produce a pulse signal at its output having a logic state 1.

Also provided in-line in the ring RI are coupling elements OE1 through OEn. These coupling elements are referred to generically herein under the designation OE. One coupling element OE is associated with one unit P, at least in FIG. 1. A further variation is provided below in connection with FIG. 5.

As can be appreciated from FIG. 1, the coupling elements OE are placed to follow one another in series within the ring RI.

Inasmuch as logic states can be symbolized by a variety of different signals, it can be appreciated that the lines comprising the ring RI can be electrical lines, but they also can be optical fibers. The coupling element such as the coupling elements OE1 to OEn thus can be formed from electronic or optical logical OR elements. For the purposes of the present description, the presently preferred embodiment includes optical fibers forming the ring RI and optical elements forming the coupling elements OE1 to OEn. Again, however, no limitation is implied by describing the invention in terms of optical elements.

Finally, as further illustrated in FIG. 1, a two-way communication or double connection is present between a given coupling element OE and its allocated unit P. In this way, a signal can be sent to the unit P from a coupling element OE and a signal can be sent from the unit P to the coupling element OE. Thus, the unit P can be informed as to whether it has been given access to the bus BU, or even the opportunity to access the bus BU, and conversely the unit P can request access to the bus BU and otherwise inform other units that it is accessing the bus BU.

Figure 2:
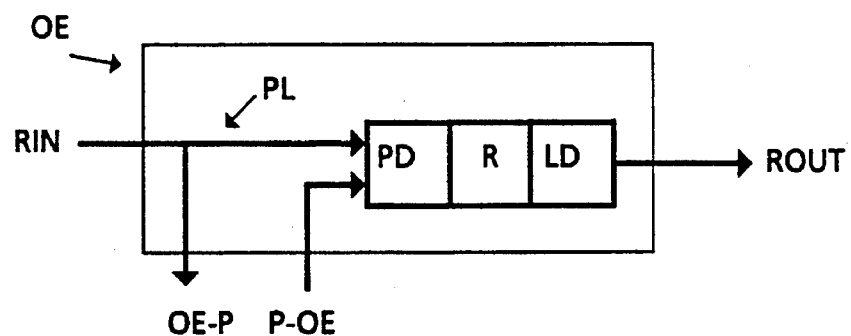
FIG. 2 illustrates an embodiment of an optical coupling element useful in the arrangement of FIG. 1.

In FIG. 2, there is illustrated an optical coupling element OE in greater detail that is useful as the coupling elements OE1 to OEn in connection with the arrangement of FIG. 1. In the optical coupling element of FIG. 2, the optical coupling element OE can be constructed with both passive input and output couplers as well as with active elements. Preferably, the optical coupling element OE includes a photodiode PD, a repeater R and a laser diode LD, all connected in series.

The photodiode PD has two inputs, one of which is coupled to an optical line PL of the ring RI and the other of which is coupled to a line P-OE from a processor P. The input of the optical element OE, which is coupled to the ring RI, is coincident with the line PL and is designated RIN. The output of the optical coupling element OE is designated ROUT. A line from the input RIN of the optical coupling element OE to the processor P is designated OE-P.

As can be appreciated, the photodiode PD functions like a logical OR element, i.e., it outputs a logical signal of a first type or a "1" (in the preferred embodiment, a light pulse) at its output whenever a logic signal of the same type or a "1" appears at one of its inputs via lines PL and P-OE. The signal appearing at the input RIN is thereby subjected to a logical OR operation with the signal provided by the processor P via the line P-OE. As a result of the logical OR operation, a logic signal of the first type is provided at the output, which in the presently preferred embodiment is a light pulse, and that signal is forwarded to the next optical coupling element, or if the optical element is the last in the line, to the pulse generator IG.

The connection between the optical coupling element OE and the allocated processor P can be an open beam connection via which light is conveyed, however, it can also be an electrical connection, with the condition that appropriate conversions between optical pulses and electrical signals would take place in the optical coupling element.

Figure 3:
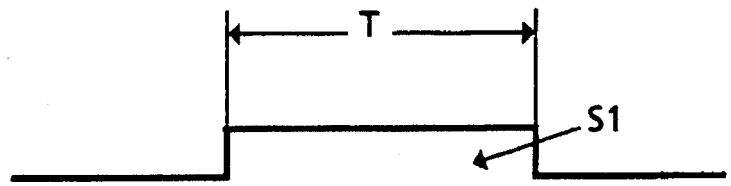
FIG. 3 illustrates a chart of a logic state signals output by a monoflop function unit useful in the arrangement of FIG. 1.
Figure 4:
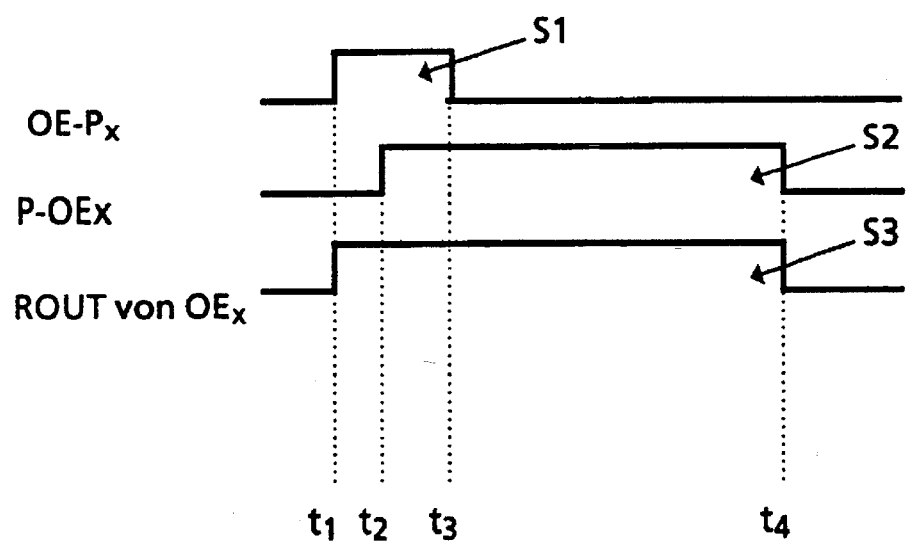
FIG. 4 illustrates a chart of possible input and an output logic state signals of a coupling element useful in the arrangement of FIG. 1 when a unit gains access to the bus.
Figure 5:
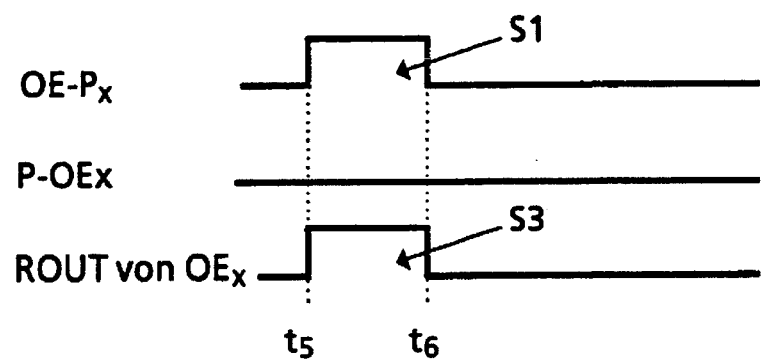
FIG. 5 illustrates a chart of possible input and output logic state signals of a coupling element useful in the arrangement of FIG. 1 when a unit does not seek access onto the bus.

The function of an optical coupling element OE is set forth in greater detail now with reference to FIGS. 3, 4 and 5. Again, for this purpose, it is assumed that when light is present, a pulse is generated, this pulse representing a logic symbol "1".

It is illustrated in FIG. 3 that the pulse generator IG, which effects a monoflop operation, generates a pulse signal S1, the pulse S1 having a pulse duration T. Of course, in order to generate the pulse S1, the pulse generator IG would have previously seen at its input a transition from a logic signal of a first type ("1") to a logic signal of a second type ("0") immediately upstream of it, i.e., at its input.

The pulse S1 is placed onto the ring circuit RI in the direction of the indicated arrows and, for example, encounters the first coupling element OE1 arranged in the ring circuit. As shown in FIG. 1, the pulse is conducted from the coupling element OE1 to its allocated processor P1 via the line OE-P.

Should the processor P1 wish to access the bus BU, the processor P1 lengthens the pulse S1 by the time it wishes to use the bus, i.e., the processor outputs a pulse signal S2, illustrated in FIG. 4, via the line P-OE to the coupling element OE1. The pulse signal referenced S3 is then output from the coupling element OE1 at its output ROUT.

As can be appreciated and as illustrated in FIG. 4, the leading edge of the pulse S1 appears at a time $t_1$, this leading edge being conducted to the processor P1. At time $t_2$, the processor P1 generates an access request to the bus BU, the leading edge of the pulse S2 then appearing at time $t_2$. At time $t_3$, i.e., at the time of the arrival of the trailing edge of the pulse S1, the processor can use the bus BU, for example, it can write information onto the bus BU. A trailing edge of the pulse S2, which arrives at a time $t_4$, is generated when the processor P1 terminates its access to the bus BU. The pulse S3 thus is the result of the logical OR operation on the pulses S1 and S2.

Should, however, the processor P1 not wish to access the bus, the pulse signals S1, S2 and S3 would appear as illustrated in FIG. 5. In this case, the processor P1 would not generate a pulse signal S2, and, correspondingly, the pulse signals S1 and S3 would essentially be the same.

Since the coupling elements OE1 through OEn are arranged in series in the ring circuit RI, the coupling element OE2 receives, as its input, the output from the prior coupling element, in this case coupling element OE1. The received signals are handled in the same way with the pulse S3 being the input signal to the following coupling element. Again, however, the actual access to the bus BU can only be obtained by a given processor when it receives a transition from a logic state of a first type to a logic state of a second type, i.e., the trailing edge of a signal representing a logic state of the first type at its ring circuit input RIN. In this way, only one processor can access the bus at a time because such a transition in the ring circuit appears at the input RIN of only one coupling element at a time.

It can be appreciated that in the initial start-up of this system, given that no logic signal of the first type has been generated by the monoflop function element IG, because no trailing edge will have been seen by that element, the first logic signal of the first type must be generated by a request for access by a processor P, and the coupling element OE associated with that processor will receive at its inputs only a request for access by its associated processor. Thus, the very first request for access by any of the processors during the start-up of the system will be denied. This, however, sets into motion the ability of that processor and other processors to commence passing of the pulse signal trailing edge "token".

Figure 6:
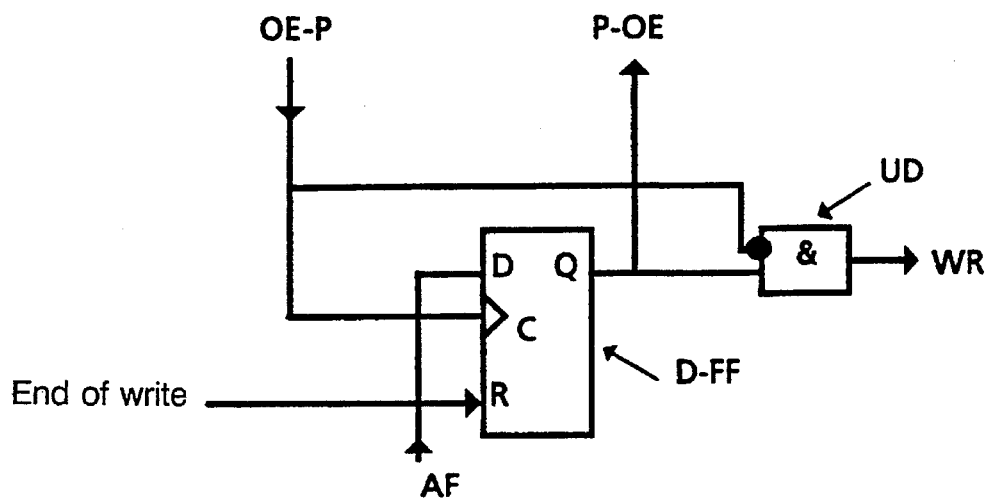
FIG. 6 illustrates a circuit that can be used by a unit connected to a bus in accordance with FIG. 1 for gaining access to the bus.

In FIG. 6, there is illustrated a circuit configured for generating the pulse S2 for a coupling element. This circuit is essentially comprised of a D-type flip-flop DFF and of an AND element UD. The signal appearing on line OE-P from the coupling element is supplied to a clock input C of the D flip-flop and is simultaneously supplied in inverted form to one input of the AND element UD. When the associated processor or unit P wishes to access the bus BU, it issues a request signal AF, which is supplied in the form of a logic signal of the first type, i.e., a "1", to a D input of the D-type flip-flop DFF. Correspondingly, the D-type flip-flop DFF generates the signal S2 at its Q output which then appears on the line P-OE coupled thereto.

The permission to write to or access the bus BU is only given after the trailing edge of the pulse S1 arrives via the line OE-P, for then the signal appearing on the line OE-P will be a logic signal of the second type, i.e., a "0", and a logic signal of the first type, i.e., a "1", is applied to the logical AND element UD and a logic signal of the first type, i.e., a "1", appears at the output of the AND element UD. After access onto the bus BU is awarded, the processor P resets the D-type flip-flop DFF via the reset input R (in the illustrated embodiment, with an end of write signal), this resulting from the fact that the pulse S2 is ended.

Figure 7:
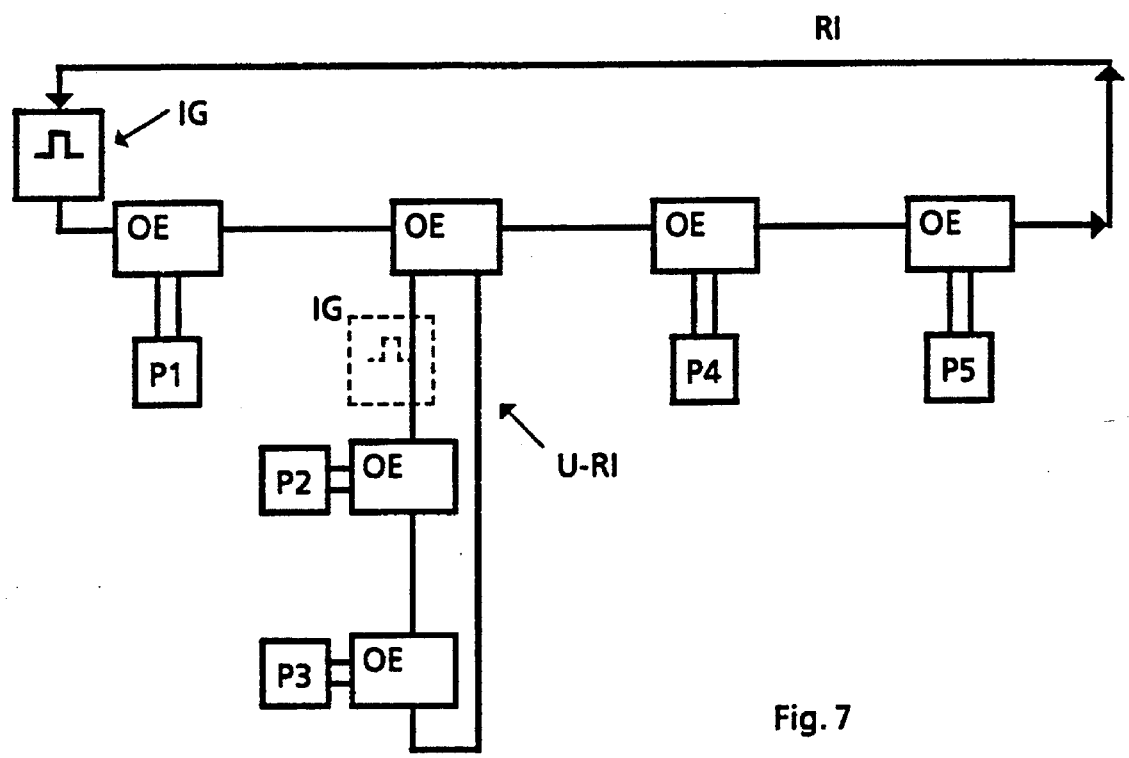
FIG. 7 illustrates the modification of the arrangement of FIG. 1 wherein a sub-ring circuit is connected to a coupling element instead of a unit seeking access to the bus.

A variation of the invention is illustrated in FIG. 7. Therein, it can be seen that a given unit P can be replaced by a sub-ring circuit, for example, the illustrated sub-ring circuit U-RI which is then connected to a coupling element OE. In essence, the ring circuit RI becomes a main arbitration ring where as the ring circuit U-RI becomes a sub-arbitration ring. In this way, it is possible to further increase the number of units or processors whose access to the bus can be controlled.

Additionally, a further monoflop function element or pulse generator can be provided in the ring U-RI in addition to the other coupling elements, this further monoflop function element or pulse generator enabling an arbitration function independently of the main arbitration function of the ring RI. It can be appreciated that this will result in overall shorter arbitration times. In FIG. 7, a pulse generator in the ring U-RI is shown with broken lines in order to indicate that such a pulse generator can be included, but is not necessary.

Although modifications and changes may be suggested by those skilled in the art, it is the intention of the inventors to embody within the patent warranted hereon all changes and modifications as reasonably and properly come within the scope of their contribution to the art.

We claim:

1. A control system for controlling access to a bus by a bus accessing unit coupled to the bus, comprising:

a unidirectional ring circuit;

a monoflop function element coupled in-line in the ring circuit and configured to generate a pulse of duration T>O downstream of the monoflop function element whenever a transition from a logic signal of a first type to a logic signal of a second type is detected by the monoflop function unit immediately upstream of the monoflop function unit; and a coupling unit coupled in-line in the ring circuit and coupled to the bus accessing unit, the coupling unit having a first input coupled to the ring circuit and a second input coupled to the bus accessing unit, the coupling unit effecting a logical OR operation on any signal appearing immediately upstream of the coupling unit in the ring circuit and an access request logic signal of the first type issued by the bus accessing unit, the coupling unit awarding access to the bus to the accessing unit whenever it receives a transition from a logic signal of the first type to a logic signal of the second type at its first input, the coupling unit generating as an output the result of the logic OR operation on the ring circuit downstream of the coupling unit, the logic OR operation generating a logic signal of the first type while a logic signal of the first type is an input to thereto.

2. The control system of claim 1, comprising:

a second coupling unit connected in-line in said ring circuit;

a second ring circuit coupled to said second coupling unit instead of another bus accessing unit; and a third coupling unit connected in-line in said second ring circuit.

3. The control system of claim 2, further comprising a second monoflop function unit connected in-line in said second ring circuit.

4. The control system of claim 1, wherein said ring circuit comprises an optical fiber and said coupling unit comprises optical elements.

5. The control system of claim 4, wherein said optical elements comprise a photo diode, a repeater and a laser diode coupled in series, said photo diode effecting said logical OR operation for said coupling unit.

6. The control system of claim 1, wherein said bus accessing unit comprises in part a D-type flip-flop element and a logical AND element, the logical AND element having a first input coupled to receive inverted versions of the signal appearing at the first input of the coupling unit, a second input coupled to receive the signal appearing at the second input of the coupling unit, and an output at which the logical AND element generates a bus access signal, the D-type flip-flop having a clock input coupled to receive the signal appearing at the first input of the coupling unit, a Q output coupled to generate a signal at the first input of the logical AND element and the second input of the coupling element, a D input coupled to a bus access request signal of the bus accessing unit, and a reset input coupled to an end of access request signal of the bus accessing unit.

7. A control system for controlling access to a bus by a plurality of bus accessing units coupled to the bus, comprising:

a unidirectional ring circuit;

a monoflop function element coupled in-line in the ring circuit and configured to generate a pulse of duration T>O downstream of the monoflop element whenever a transition from a logic signal of a first type to a logic signal of a second type is detected by the monoflop function unit immediately upstream of the monoflop function unit; and a plurality of coupling units coupled in-line and respectively coupled to the bus accessing units, each coupling unit having a first input coupled to the ring circuit and a second input coupled to its respective bus accessing unit, each coupling unit effecting a logical OR operation on any signal appearing immediately upstream of the coupling unit in the ring circuit and an access request logic signal of the first type issued by the bus accessing unit, each coupling unit awarding access to the bus to its respective accessing unit whenever the coupling unit receives a transition from a logic signal of the first type to a logic signal of the second type at its first input, each coupling unit generating the result of its respective logic OR operation as an input downstream of the coupling unit, each logic OR operation generating a logic signal of the first type while a logic signal of the first type is an input thereto.

8. The control system of claim 7, comprising:

a second ring circuit coupled to one of said coupling units instead of another bus accessing unit; and a further coupling unit connected in-line in said second ring circuit.

9. The control system of claim 8, further comprising a second monoflop function unit connected in-line in said second ring circuit.

10. The control system of claim 7, wherein said ring circuit comprises an optical fiber and each said coupling unit comprises optical elements.

11. The control system of claim 10, wherein said optical elements comprise a photo diode, a repeater and a laser diode coupled in series, said photo diode effecting said logical OR operation for each said coupling unit.

12. The control system of claim 7, wherein each bus accessing unit comprises in part a D-type flip-flop element and a logical AND element, the logical AND element having a first input coupled to receive inverted versions of the signal appearing at the first input of its respective coupling unit, a second input coupled to receive the signal appearing at the second input of the coupling unit, and an output at which the logical AND element generates a bus access signal, the D-type flip-flop having a clock input coupled to receive the signal appearing at the first input of the coupling unit, a Q output coupled to generate a signal at the first input of the logical AND element and the second input of the coupling unit, a D input coupled to a bus access request signal of the bus accessing unit, and a reset input coupled to an end of access request signal of the bus accessing unit.

* * * * *